Inventors
John H. Morrow and
Charles Mednick

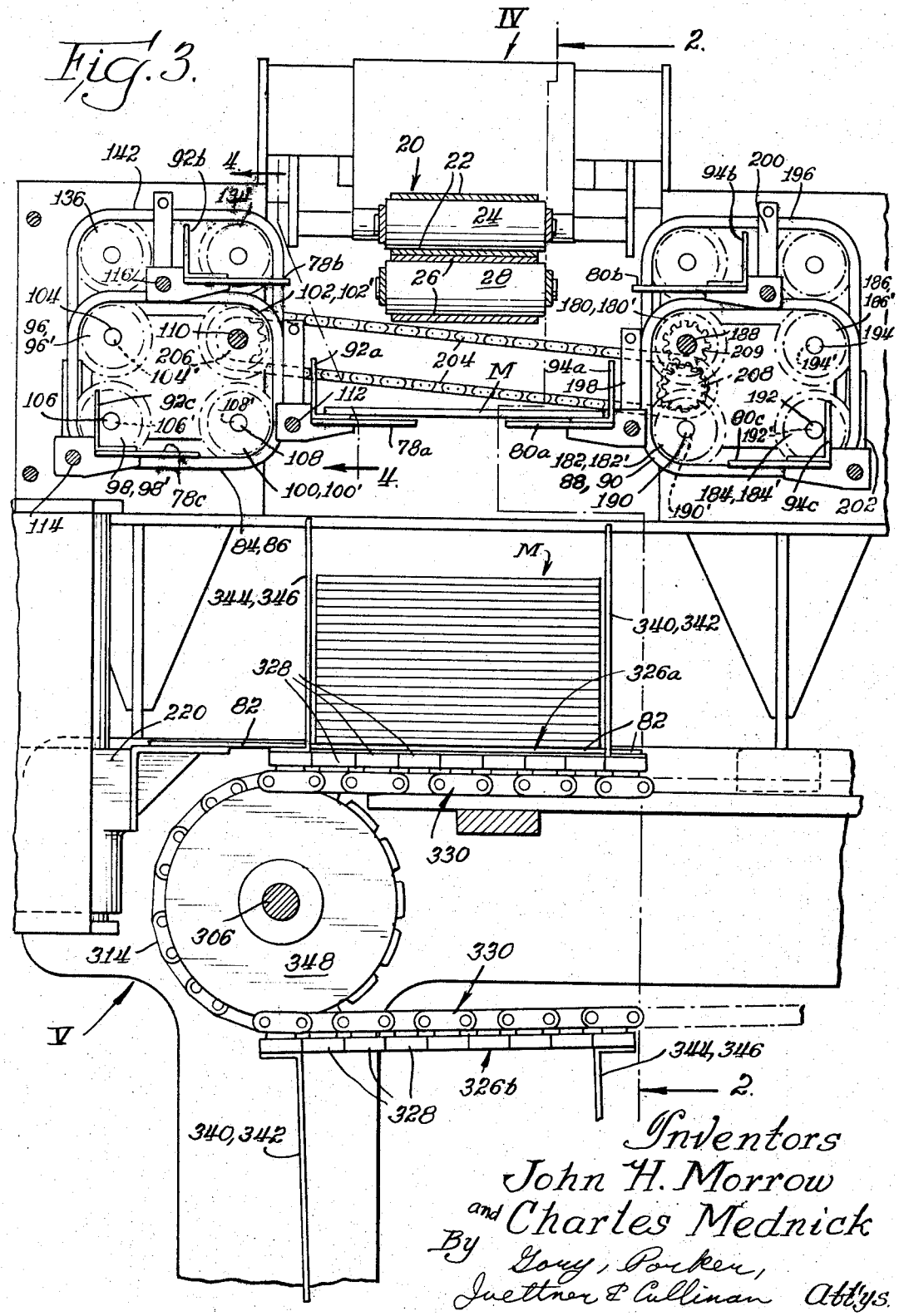

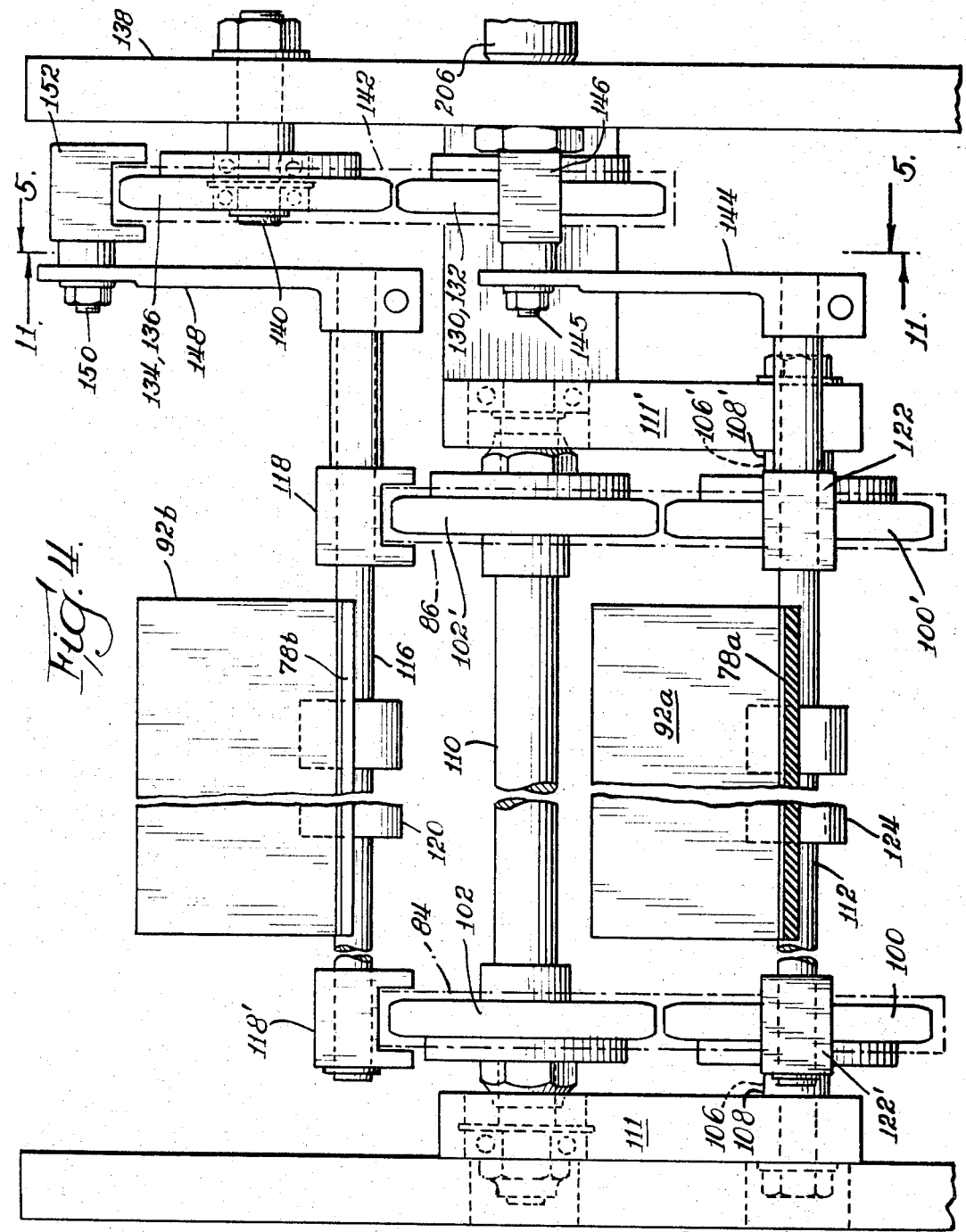

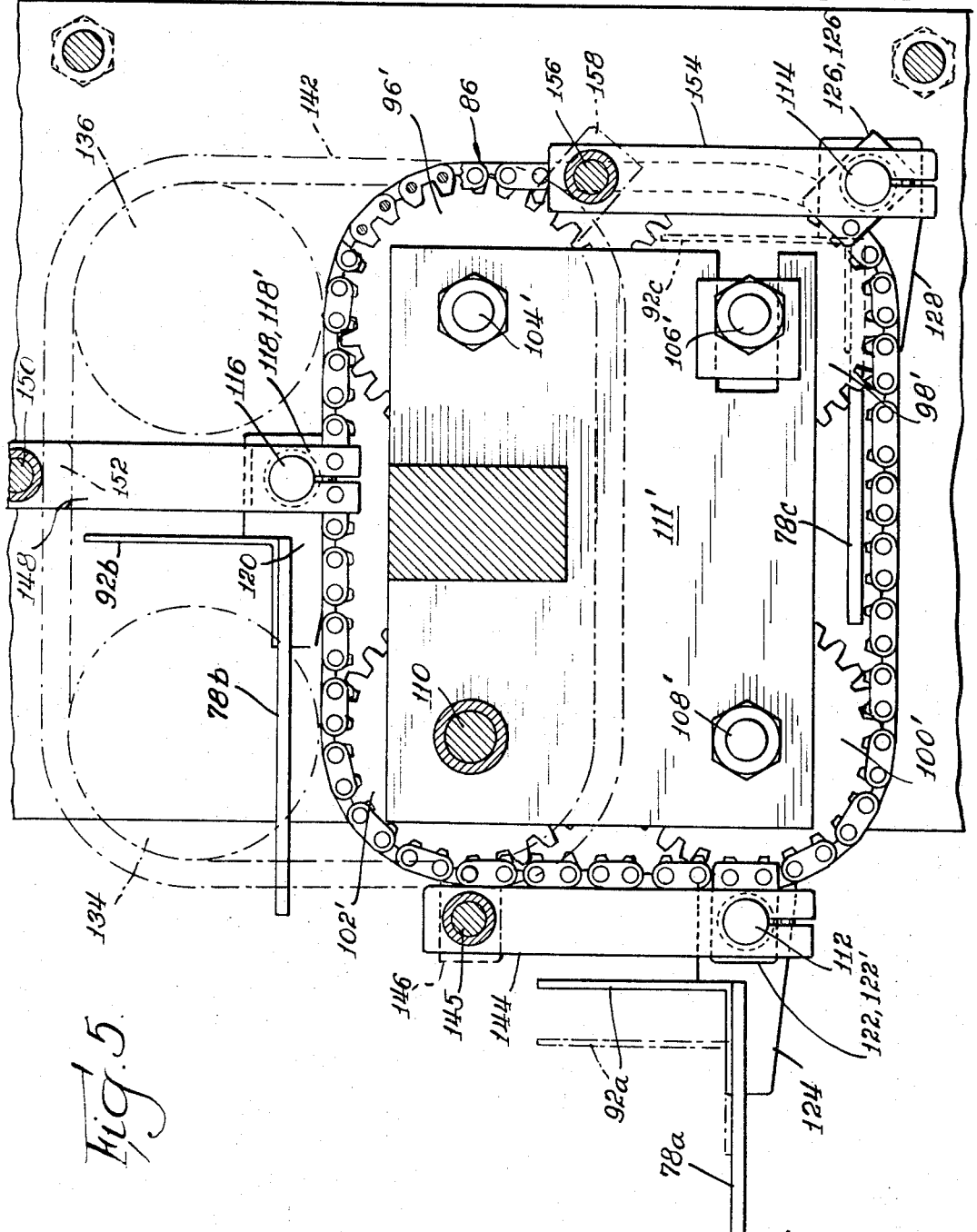

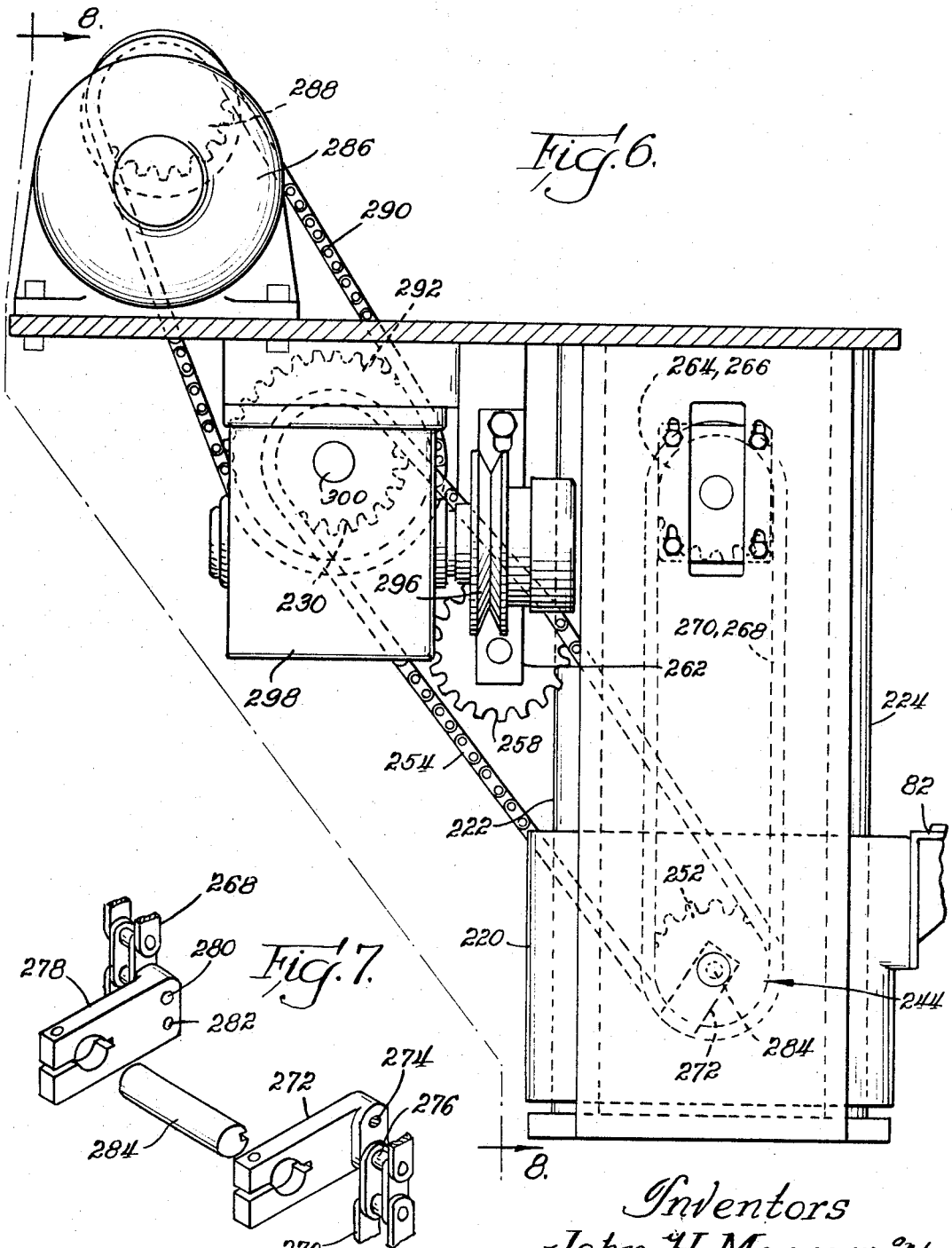

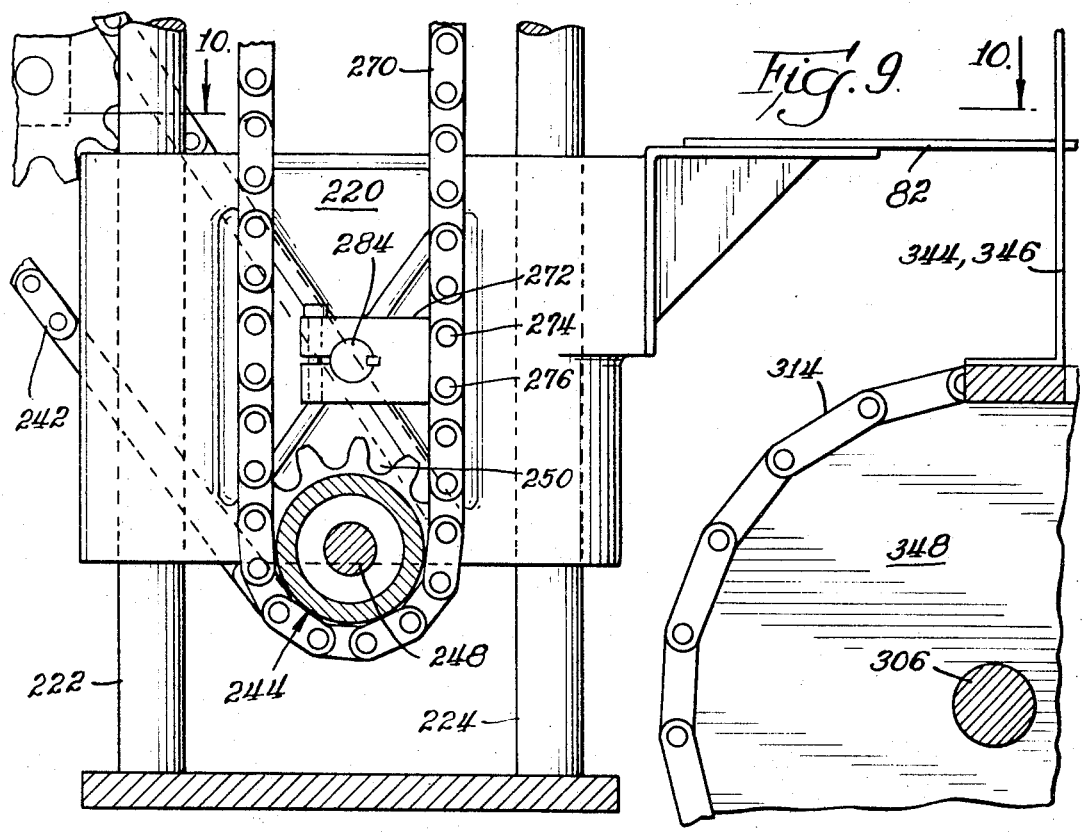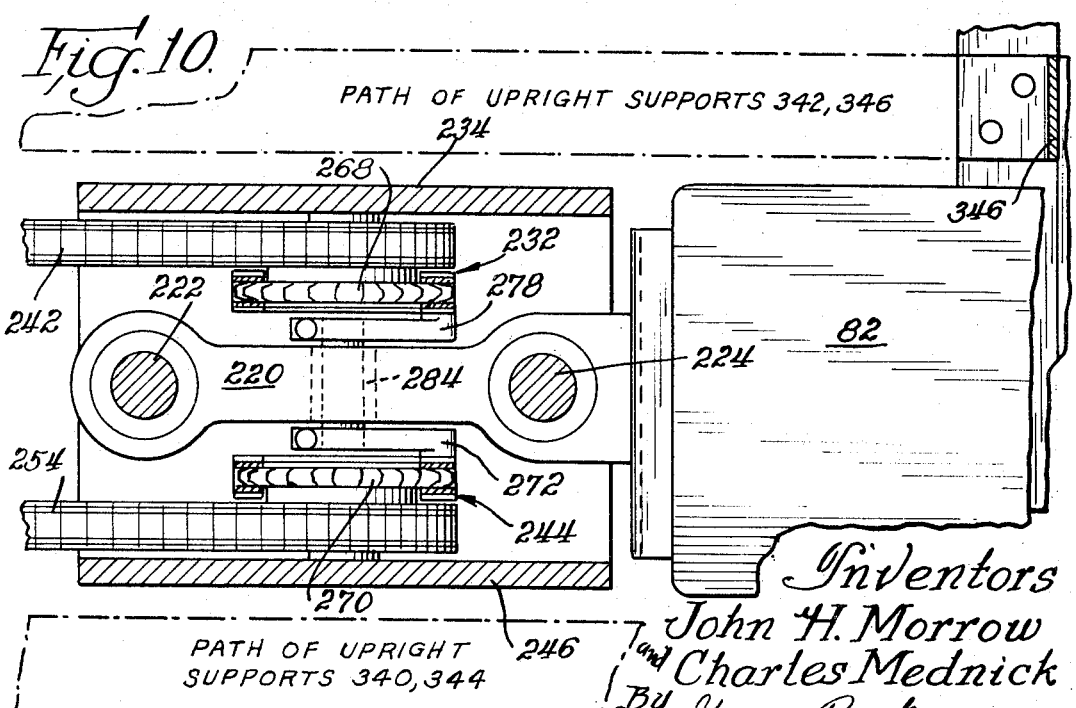

Inventors
John H. Morrow and
Charles Mednick
By Gary, Parker,
Juettner & Cullinan Attys.

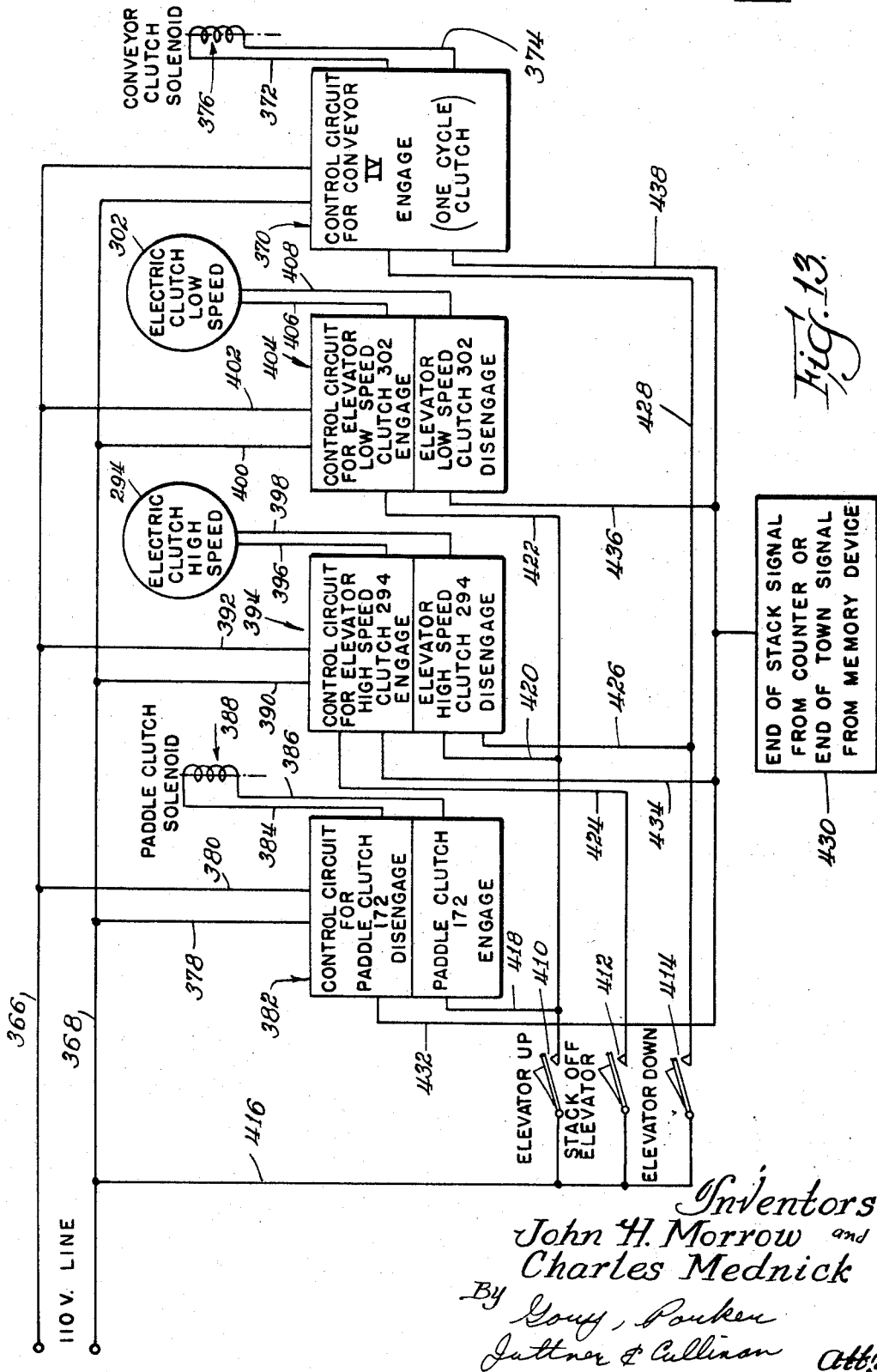

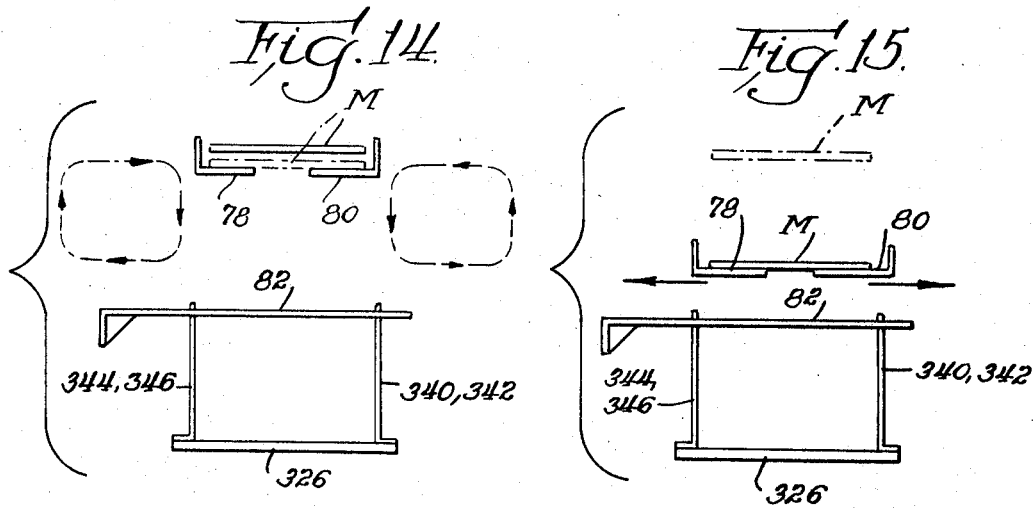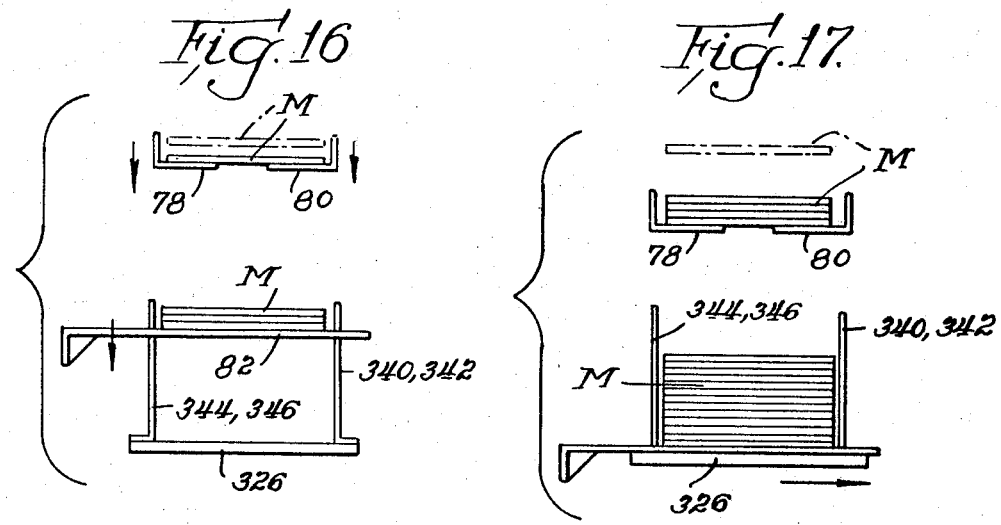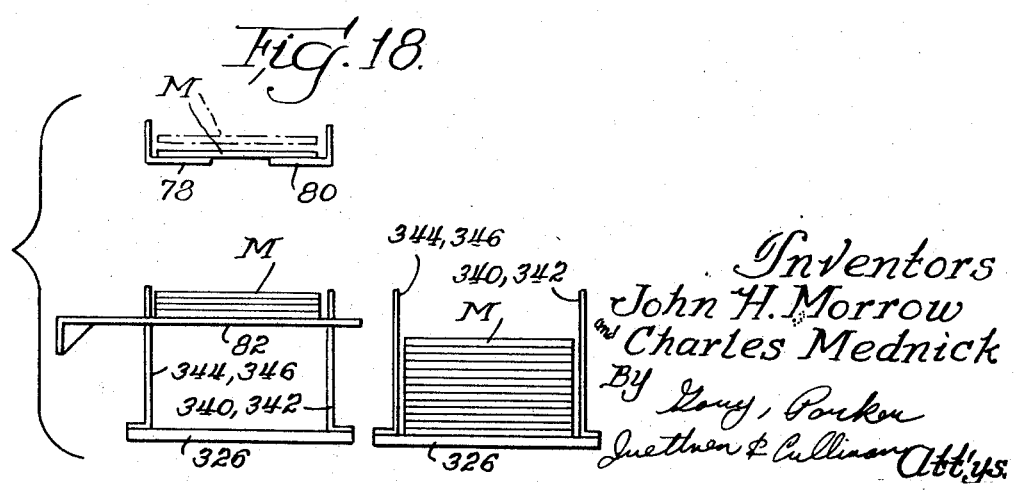

United States Patent Office 3,420,386
Patented Jan. 7, 1969

3,420,386
STACKING MACHINE
John H. Morrow, Oak Lawn, and Charles Mednick, Posen, Ill., assignors to Magnacraft Manufacturing Company, Chicago, Ill., a copartnership
Filed Apr. 15, 1966, Ser. No. 542,778
U.S. Cl. 214—6    12 Claims
Int. Cl. B65g 57/00

ABSTRACT OF THE DISCLOSURE

Improved stacking apparatus for receiving articles from a conveyor, particularly magazines or other flexible articles, and stacking such articles one on top of the other so as to form a plurality of large stacks of predetermined size, such stacking operation being accomplished by mechanism which receives articles one at a time from a supply conveyor or the like and which releases the articles to a vertically reciprocating elevator member after first lowering each article to a position adjacent the top of the elevator or the top of a stack of articles positioned on the elevator.

---

The present invention relates to a stacking machine which receives articles from a conveyor or other article supply means and stacks such articles one on top of the other so as to form a plurality of large stacks. The stacking machine of the present invention is intended primarily for the handling of magazines, books, leaflets, brochures and other like mailable matter. While the machine will be described herein by way of example as used in the handling of magazines, it should be understood that it may be used for handling various types of mailable matter and may have other applications as well.

In the handling of magazines to be sent through the mail it is desirable from the standpoint of efficiency and economy that as many as possible of the necessary operations from the assembling of the magazines to the stacking and tying of magazine bundles ready for mailing be carried out by means of automatic machinery. In the formation of magazines or the like, a plurality of signatures, each comprising a folded printed sheet containing a number of printed pages, are assembled together by an inserting machine, and such signatures are bound or stitched together along one side edge in any desired manner and the trimmed at the other three edges in a trimmer machine so as to provide a completed magazine. When the magazines leave the inserter-trimmer they may be conveyed one or more at a time to a hopper loader which feeds the magazines one at a time to a mailing machine including a label affixing unit which applies a mailing address label to each magazine. After the magazines leave the label affixing unit they are grouped into a purality of large stacks which may for example each comprise approximately thirty magazines, and such stacks may then be tied and sent out for mailing.

It will be understood that the address labels are affixed to the magazines in a predetermined order in accordance with the city or town designated on the label, and thus as the magazines leave the label affixing unit they will be formed into stacks of magazines according to the city or town to which they are addressed. For this reason, the size of the stacks may vary, since when the end of a town is reached it is desirable to start a new stack thereby keeping all magazines going to a given town in separate stacks. Accordingly, the magazines coming from the label affixing unit are arranged in stacks, which may each for example comprise 20 or 30 magazines, the size being whatever is considered convenient for futher handling, with the additional consideration that separate stacks are provided for different cities or towns as indicated on the address labels.

The stacking machine of the present invention is useful in various applications, but it is particularly intended for use in a system as described above for receiving magazines as they are fed one at a time from a label affixing unit, forming such magazines into stacks of convenient size, and conveying such stacks away for tying and/or further handling as desired. In such an application the stacking machine will receive the magazines continuously one by one from the label affixing unit, and in accordance with a preferred embodiment of the invention the stacking machine will handle the magazines individually and lower them one at a time to a stack. However, it will be seen that the stacking machine of the present invention is also capable of temporarily accumulating magazines during the time that a completed stack is being conveyed away, after which the magazines accumulated during such time interval are released so as to comprise the beginning of a new stack.

It is therefore an object of the present invention to provide an improved stacking machine which is adapted to continuously receive magazines or other mailable items one by one and to form the same into a plurality of stacks of predetermined size.

Another object of the invention is to provide a stacking machine which is unusually reliable in operation even at high speeds and which is particularly adapted to continuously receive magazines from a label affixing unit, form the magazines into stacks of predetermined sizes, and convey such stacks away one by one for further handling.

The foregoing and other objects and advantages of the invention will be apparent from the following description of a preferred embodiment thereof.

Now, in order to acquaint those skilled in the art with the manner of making and using our invention, we shall describe, in conjunction with the acompanying drawings, the best mode contemplated by us of carrying out the invention.

In the drawings:

FIGURE 3 is a vertical sectional view taken substantially along the line 3—3 of FIGURE 2;

FIGURE 4 is an enlarged fragmentary vertical sectional view taken substantially along the line 4—4 of FIGURE 3;

FIGURE 5 is a vertical sectional view taken substantially along the line 5—5 of FIGURE 4;

FIGURE 6 is an enlarged fragmentary vertical sectional view taken substantially along the line 6—6 of FIGURE 2;

FIGURE 7 is a perspective view of a pair of chain driven arms and a cross rod which cooperate to move an elevator carriage upwardly and downwardly, such members comprising components of the stacking machine of the present invention;

FIGURE 9 is a fragmentary vertical sectional view taken substantially along the line 9—9 of FIGURE 8;

FIGURE 10 is a fragmentary horizontal sectional view taken substantially along the line 10—10 of FIGURE 9;

FIGURE 13 is a simplified schematic wiring diagram showing the electrical control circuit for the stacking machine of the present invention; and FIGURES 14 to 18 are schematic elevational views showing the stacking machine of the present invention in various sequential stages of its operation.

GENERAL DESCRIPTION

Figure 1:
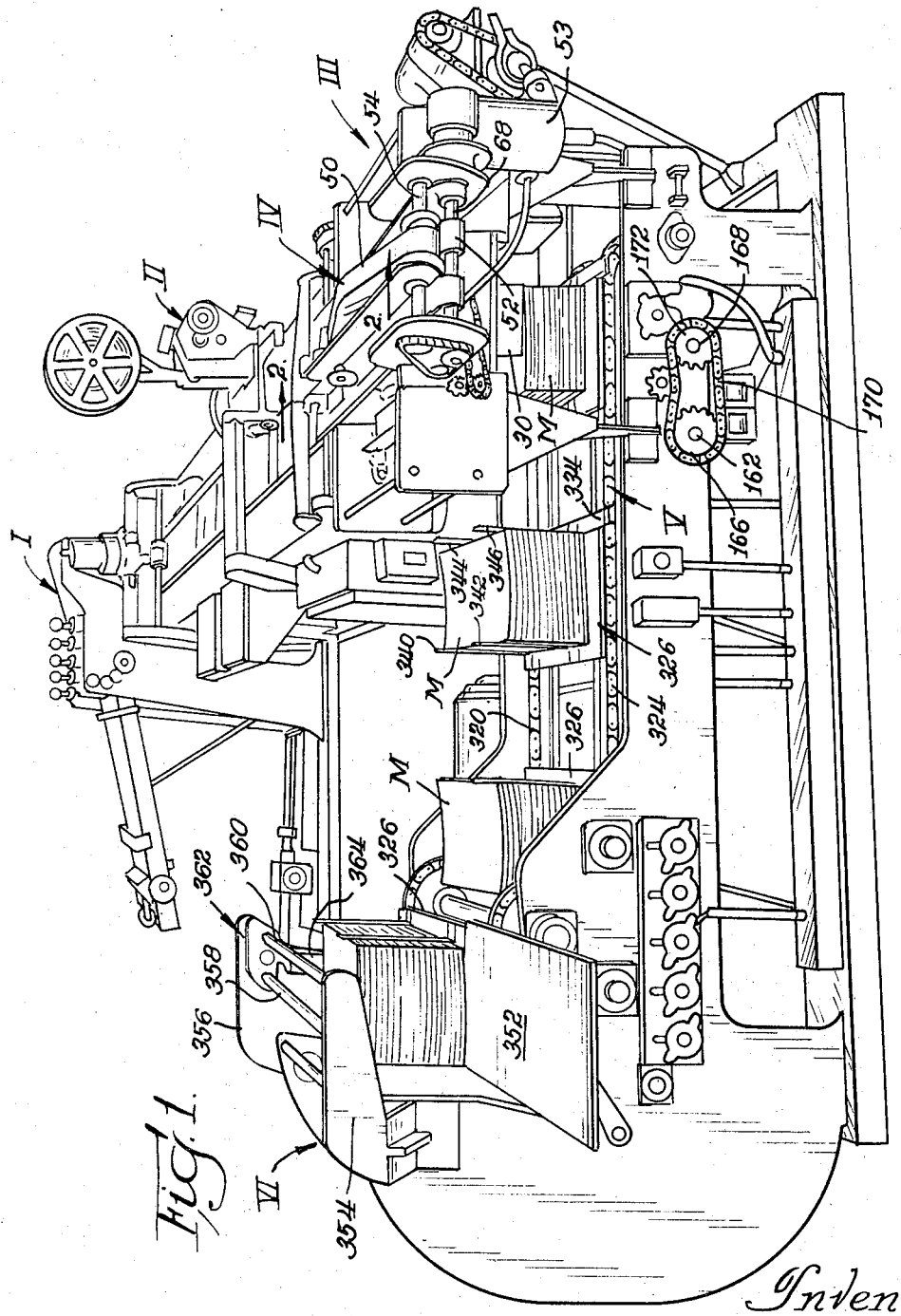
FIGURE 1 is a perspective view of a magazine mailing system which includes as one component thereof a stacking machine constructed in accordance with the present invention.

Referring now to the drawings, FIGURE 1 shows a mailing system for handling magazines and other mailable matter comprising a hopper loader I, a label affixing unit II, an automatic stacking machine III, a diverter IV mounted on the top of the stacking machine III, a take-away conveyor system V for conveying stacks of magazines from the stacking machine III, and a conveyor unloading device VI. Magazines are suppled from a trimming machine (not shown) directly to the hopper loader I. The magazines are normally received two or more at a time from the trimmer, and the hopper loader I accumulates such magazines in a hopper and feeds them one at a time to the label affixing unit II which automatically affixes an address label to each magazine.

The magazines leaving the label affixing unit II are supplied to the stacking machine III which forms the magazine into stacks of convenient size and which also begins a new stack at the beginning of a new town designation as indicated on the address labels. Where only one or a very small number of magazines are designated for a given town, so as to make it impractical to form a stack thereof, the diverter IV is operated to take such "singles" over the stacker to a separate conveyor (not shown). Stacks of magazines formed by the stacking machine III are conveyed therefrom by a take-away conveyor system V and delivered to a conveyor onloading device VI which may if desired be utilized to move the stacks to a further conveyor (not shown) leading to a tying and bagging station (not shown).

Figure 2:
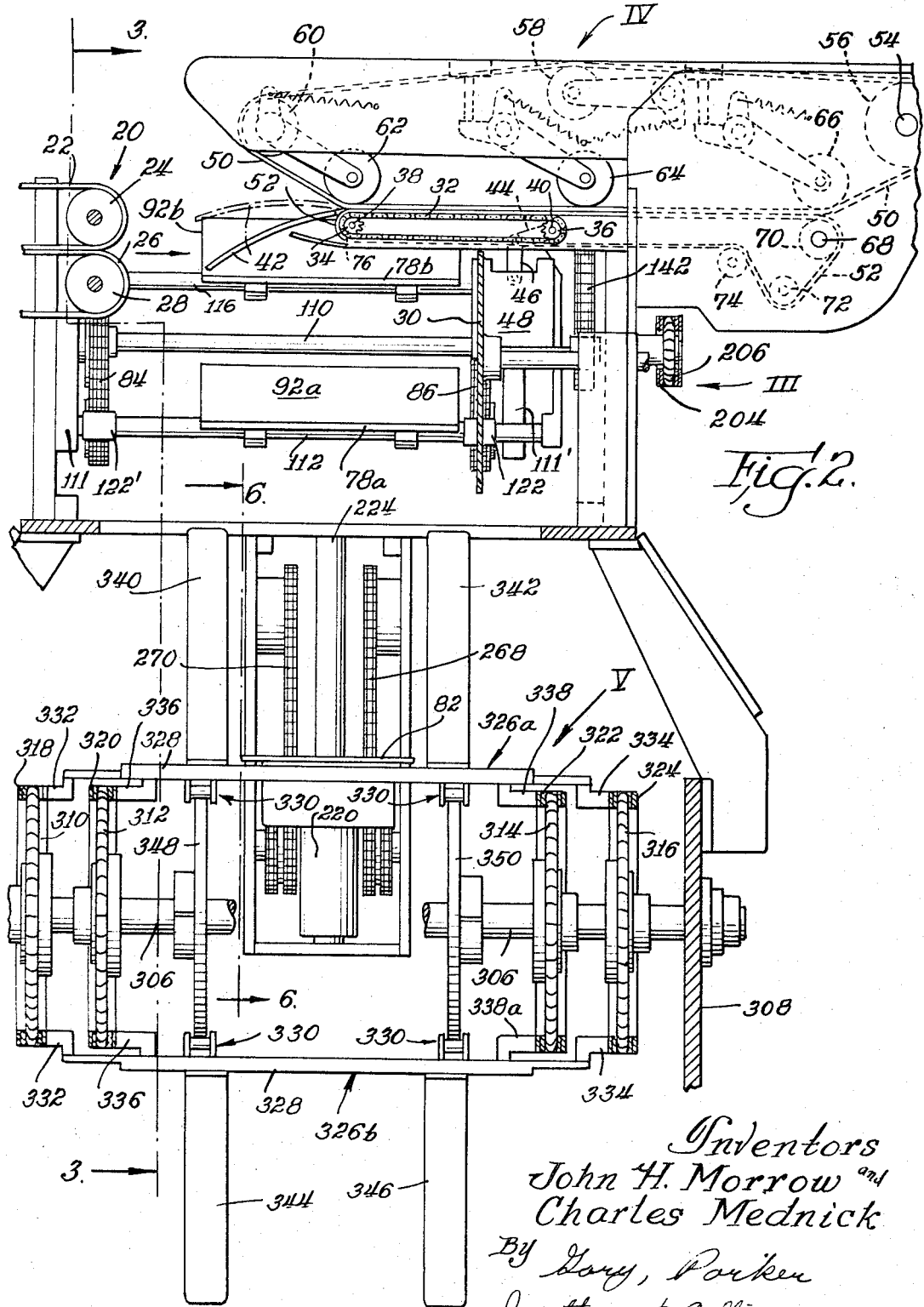
FIGURE 2 is a vertical sectional view, taken substantially along the line 2—2 of FIGURE 3, showing the stacking machine of the present invention, including at the top thereof a diverter mechanism which is selectively operable to divert magazines past the stacking machine without stacking the same.

The present invention relates to the stacking machine III, the diverter IV, the take-away conveyor V, and to the cooperation of these components with one another and with the other components of the mailing system of FIGURE 1. FIGURE 2 shows a conveyor 20 which feeds magazines one at a time from the label affixing unit II to the stacking machine III. The conveyor 20 includes an upper feed belt 22 which is trained over a pulley 24, and a lower feed belt 26 which is trained over a pulley 28. Magazines being delivered by the conveyor 20 to the stacking machine III are carried between the upper and lower feed belts 22 and 26 and are moved to the right as viewed in FIGURE 2 so as to be fed against an adjustable stop plate 30, except in certain cases where one or a small number of magazines are passed over the stacking machine and through the diverter IV.

DIVERTER MECHANISM

FIGURE 2 shows a small endless chain 32 trained over a pair of sprockets 34 and 36 mounted respectively on shafts 38 and 40. The left hand shaft 38 carries an arcuate diverter guide plate 42 which pivots with the shaft, the guide plate being shown in solid lines in its lower divert position and in dash lines in its upper inoperative position. A crank 44 has one end connected with the right hand shaft 40, and the other end of the crank is connected with a vertically movable plunger 46 of a diverter solenoid 48. When the solenoid 48 is actuated it pulls the plunger 46 downwardly and thereby rotates the right hand sprocket 36 through a small angle in a counterclockwise direction. The right hand sprocket 36 acts through the chain 32 to rotate the left hand sprocket 34 in the same direction, thereby pivoting the diverter guide plate 42 to its lowered divert position as shown in solid lines. When the solenoid 48 is deenergized the spring-loaded plunger 46 returns to its upper position, and in a manner similar to that described above the sprocket 36 acts through the chain 32 to pivot the guide 42 to its inoperative upper position as shown in dash lines.

When the diverter guide plate 42 is in its lower position as shown in solid lines in FIGURE 2, magazines delivered by the conveyor 20 are guided upwardly over the stacking machine III and pass into a nip defined between upper and lower diverter belts 50 and 52. A diverter motor 53 (see FIGURE 1) drives a drive shaft 54 having a pulley 56 thereon which in turn serves to drive the upper belt 50 over a plurality of spring loaded pulleys indicated at 58, 60, 62, 64 and 66, while a drive shaft 68 is driven in a reverse direction from the shaft 54 and has a pulley 70 thereon which serves to drive the lower diverter belt 52 over a plurality of pulleys 72, 74 and 76. Accordingly, when the guide plate 42 is down, a magazine delivered by the conveyor 20 will pass between the diverter belts 50 and 52 and be delivered thereby to a separate conveyor (not shown). The purpose of the diverter IV is so that when only one or a very small number of magazines are addressed to a given town, so that stacking and tying of such magazines is not practical, they will be diverted past the stacking machine to a separate conveyor. The diverter solenoid 48 is operated by a signal from electronic sensing means (not shown) at the label affixing unit II which scans the address labels for information and transmits signals to the stacking machine III and the diverter IV in accordance therewith.

PADDLE MECHANISM

The diverter guide plate 42 will normally be disposed in its upper inoperative position shown in dotted lines in FIGURE 2 so that magazines delivered one by one from the conveyor 20 will be fed against the stop plate 30 and then fall downwardly onto a pair of movable paddle support members 78 and 80 (see FIGURE 3) which are timed with the delivery of the magazines so that just as a magazine engages the stop plate 30 and begins to fall downwardly a pair of the paddles 78 and 80 move substantially immediately beneath the magazine to catch the same. The paddle support members 78 and 80 lower the magazine under control and then release the same to an elevator collecting plate 82 on which the magazines are stacked one on top of the other until a stack having a predetermined number of magazines is formed or until the stacking machine III receives a signal from the label affixing unit II indicating the end of a town has been reached.

Referring to FIGURES 3–5, there are three flexible paddles 78a, 78b and 78c, all of which are carried on a pair of roller or silent chains 84 and 86, and there are three oppositely disposed flexible paddle supporting members 80a, 80b and 80c which are carried on a second pair of roller or silent chains 88 and 90 (see FIGURE 3). As will be described more fully hereinafter the paddles 78a, 78b and 78c are equally spaced along the length of the chains 84 and 86 and each is maintained in a horizontal position as it moves with the chains around a generally rectangular path. In a similar manner, the opposite paddles 80a, 80b and 80c are equally spaced apart on the chains 88 and 90 and each is maintained in a horizontal position as it moves with the chains around a generally rectangular path in synchronism with the first-mentioned paddles 78a, 78b and 78c, and in timed relation with the delivery of magazines to the stacking machine III from the conveyor 20. It will be seen that the three horizontal paddles 78a, 78b and 78c have associated therewith vertical support members 92a, 92b and 92c, while the opposite horizontal paddles 80a, 80b and 80c have associated therewith vertical support members 94a, 94b and 94c.

Referring to FIGURE 3, the chains 84 and 86 carry the three paddles 78 around their generally rectangular path in a clockwise direction, while the chains 88 and 90 move the paddles 80 at the same speed in a counterclockwise direction. It will be understood that the paddles 78a and 80a cooperate with one another to receive a magazine, lower the magazine under control, and then release the same. In a similar manner, the two paddles 78b and 80b cooperate with one another, and the two paddles 78c and 80c cooperate with one another. In each instance two of the paddles receive a magazine which has been delivered by the conveyor 20 against the stop plate 30 (see FIGURE 2), lower the magazine, and then release the magazine, which as will be explained more fully hereinafter is then piled in a stack on the elevator collecting plate 82. For example, in FIGURE 3 the paddles 78b and 80b are moving toward one another and are at the upper portions of their rectangular paths of movement. As the paddles 78b and 80b continue to move toward one another they will cooperate to receive and support a magazine delivered against the stop plate 30 from between the upper and lower feed belts 22 and 26 of the conveyor 20. As the support paddles 78b and 80b move downwardly they lower the magazine under control, and as the paddles then move away from one another they release the magazine which falls a short distance to the elevator collecting plate 82.

As shown in FIGURE 3, the chain 84 is trained over four sprockets 96, 98, 100 and 102 which are mounted on four shafts 104, 106, 108 and 110. The three shafts 104, 106 and 108 are stub shafts which are mounted from a stationary block 111 (see FIGURE 4). The shaft 110 is a drive shaft, and thus the sprocket 102 serves to drive the chain 84 in a clockwise direction, while the other three sprockets 96, 98 and 100 serve as idler sprockets. In addition, sprockets 96', 98', 100' and 102' are mounted on separate stub shafts 104', 106', 108' and on the opposite end of the drive shaft 110, respectively, and the chain 86 is trained over the latter four sprockets as shown in FIGURES 4 and 5 and is driven from the sprocket 102'. The stub shafts 104', 106' and 108' are mounted from a stationary block 111' as shown in FIGURE 4. It should be noted that only the drive shaft 110 extends between the two sets of sprockets, while the remaining shafts 104, 106 and 108 mounted from the block 111 and shafts 104', 106' and 108' mounted from the block 111' are all stub shafts and thus do not bridge the space between the two chains 84 and 86. The two chains 84 and 86 cooperate to rotatably carry opposite ends of three rods 112, 114 and 116 (see FIGURE 5), and the three paddle support members 78a, 78b and 78c are fixedly mounted on such rods for movement therewith around the generally rectangular path of the chains.

Referring to FIGURE 5, it will be seen that a bracket 118 is rigidly affixed to the chain 86 and carries one end of the rod 116, and it will be understood that a similar bracket 118' is affixed to the opposite chain 84 and carries the other end of the rod. The horizontal paddle member 78b and the vertical support member 92b are fixedly mounted on the rod 116 by a bracket 120. The rod 116 is free to pivot relative to the chains 84 and 86, and stabilizer means to be described hereinafter are provided so as to maintain the paddle member 78b in a horizontal position at all times as it moves through a generally rectangular path with the chains. In a similar manner, a bracket 122 is rigidly affixed to the chain 86 and a bracket 122' is affixed in a corresponding position on the chain 84, and these two brackets rotatably carry the opposite ends of the rod 112. The horizontal support member 78a and vertical support member 92a are fixedly mounted on the rod 112 by a bracket 124. In addition, a bracket 126 is rigidly affixed to the chain 86 and a bracket 126' is affixed in a corresponding position on the chain 84, and the brackets 126 and 126' rotatably carry the opposite ends of the rod 114. The horizontal support member 78c and vertical support member 92c are fixedly mounted on the rod 114 by a bracket 128.

The three paddle supports 78 are equally spaced on the chains 84 and 86, and as will be explained more fully hereinafter the chains are driven in timed relation with the operation of the label affixing unit II and conveyor 20 so that each time a magazine is fed against the stop plate 30 from the conveyor 20 one of the pairs of paddles 78a and 80a, 78b and 80b, or 78c and 80c will move into position substantially immediately beneath the magazine so as to catch the same, lower it under control, and then release the magazine to the elevator collecting plate 82.

Figure 11:
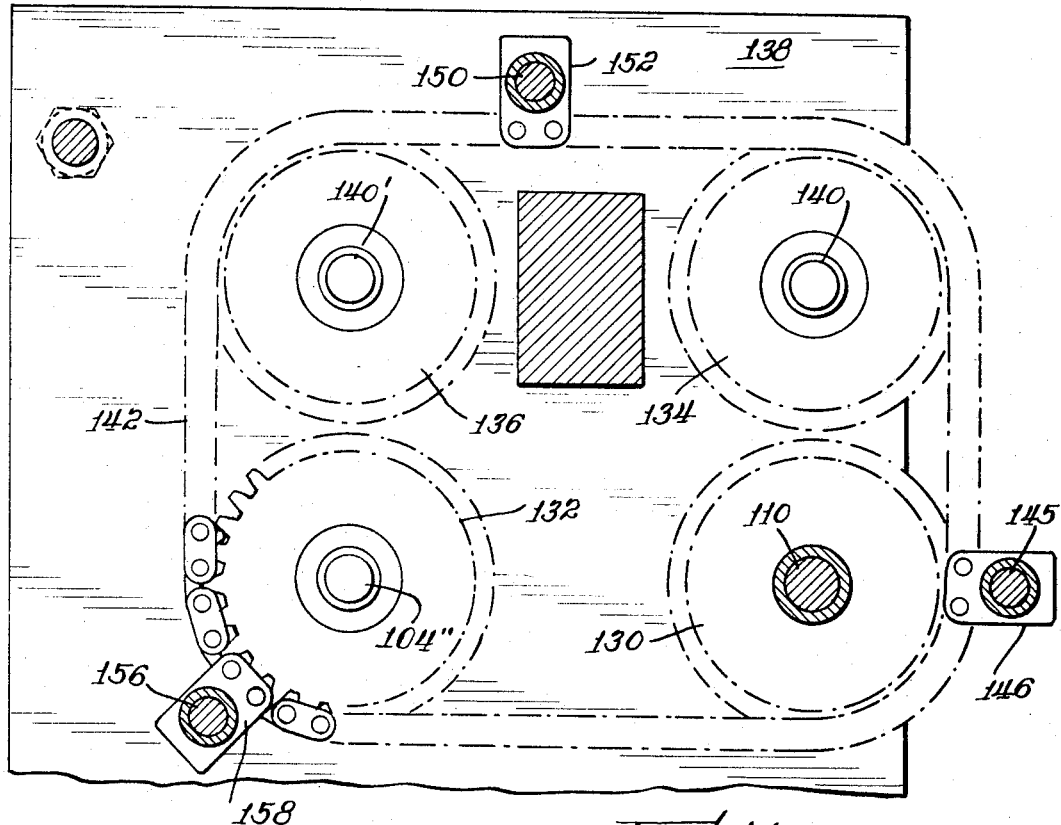
FIGURE 11 is a vertical sectional view taken substantially along the line 11—11 of FIGURE 4.
Figure 12:
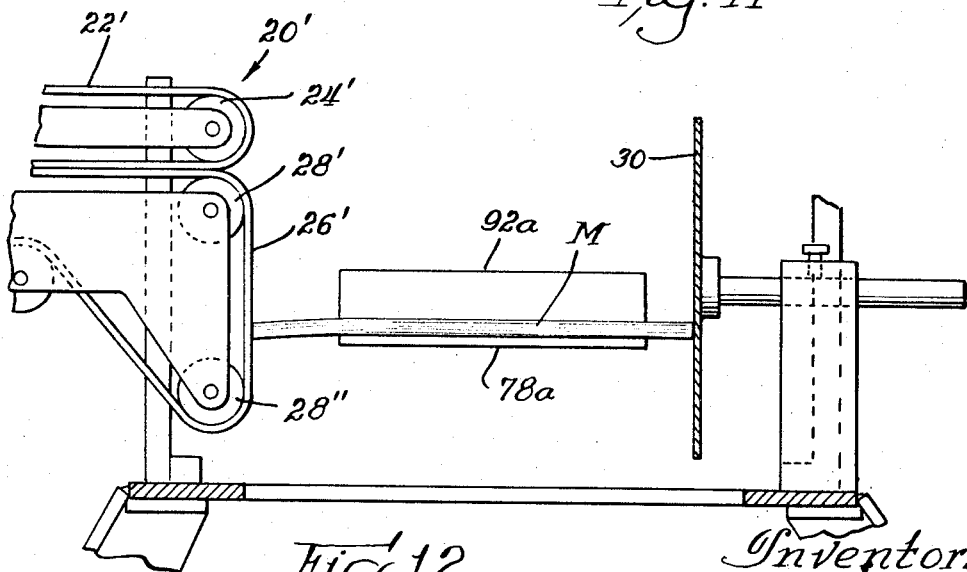
FIGURE 12 is a fragmentary vertical sectional view, partly in elevation, showing a modified form of the conveyor of FIGURE 2 for delivering magazines from a label affixing unit to the stacking machine.

Stabilizing means will now be described for maintaining the orientation of the paddles 78 and 80 as they move around the generally rectangular path of the chains 84 and 86. FIGURES 4 and 11 show a sprocket 130 which is mounted on the drive shaft 110 adjacent one end thereof and spaced substantially from the sprocket 102'. A sprocket 132 is mounted on a stub shaft 104" so as to be disposed in the plane of the sprocket 130. The stub shaft 104" is mounted from a stationary frame element 138 so as to be coaxial with the separate stub shafts 104 and 104'. An additional pair of sprockets 134 and 136 are mounted above the sprockets 130 and 132 so as to be coplanar therewith, the latter two sprockets being supported from the frame element 138. Thus, FIGURE 4 shows the sprocket 134 mounted on a stub shaft 140 which is supported from the frame 138, and it will be seen from FIGURE 11 that the sprocket 134 is disposed immediately above the sprocket 130 on the drive shaft 110. In a similar manner, the sprocket 136 is supported on a stub shaft 140' from the frame 138 so as to be disposed immediately over the sprocket 132 which is mounted on the stub shaft 104". A roller or silent chain 142 is trained over two lower sprockets 130 and 132 and the two upper sprockets 134 and 136 and is driven around a generally rectangular path by the drive sprocket 130. The path of the chain 142 is identical to that of the chains 84 and 86, and they are all driven at the same speed from the common drive shaft 110. However, as shown in FIGURE 4, the chain 142 is displaced upwardly and to one side relative to the chains 84 and 86.

As previously described, the three horizontal paddles 78a, 78b, and 78c are fixedly carried on the rods 112, 116 and 114, and in each instance the paddles are maintained in a horizontal position at all times by a stabilizer link which extends from the corresponding mounting rod to a point of connection with the third chain member 142. Thus, referring to FIGURES 4 and 5, a stabilizer link has one end fixedly mounted on the end of the rod 112 and has its other end pivotally connected by pin means 145 to a bracket 146 which is rigidly connected to the chain 142. Consequently, as the chains 84, 86 and 142 are driven from the drive shaft 110, the stabilizer arm 144 is held in a vertical position at all times due to its connection with the chain 142, and as a result the paddle 78a is maintained in a horizontal position and the support 92a is maintained in a vertical position.

In a similar manner, a stabilizer link 148 has one end fixedly mounted on the end of the rod 116 and has its other end pivotally connected by pin means 150 to a bracket 152 which is rigidly connected to the chain 142. In addition, a stabilizer link 154 has one end fixedly mounted on the end of the rod 114 and has its other end pivotally connected by pin means 156 to a bracket 158 which is rigidly connected to the chain 142. Thus, all three of the paddles 78a, 78b and 78c are maintained in horizontal positions at all times due to the fact that they are free to pivot with their mounting rods relative to the chains 84 and 86 on which they are carried, and because of the stabilizer links 144, 148 and 154 and the stabilizer chain 142 which controls the orientation of the latter.

As has been stated hereinabove, the drive shaft 110 serves to drive the three sprockets 102, 102' and 130 which are mounted thereon, and in this manner the shaft 110 drives the three chains 84, 86 and 142 at the same speed. Moreover, the drive shaft 110 is driven from the drive for the label affixing unit II and the conveyor 20 so as to assure that the movement of the paddles 78 is in timed relation with the delivery of magazines from the unit II to the stacking machine III. FIGURE 1 shows a shaft 162 which is driven at its far end from the label affixing unit II. A sprocket 166 is mounted on the near end of the shaft 162, and the sprocket 166 drives a second shaft 168 through a chain 170 and a solenoid controlled paddle clutch 172. The opposite or far end of the shaft 168 drives the paddle drive shaft 110 through a sprocket and chain drive (not shown), and in this manner drives the three chains 84, 86 and 142 in timed relation with the label affixing unit II. It will be understood from the foregoing that whenever the paddle clutch 172 of FIGURE 1 is disengaged, the foregoing chains 84, 86 and 142 will be stopped, as will the paddle members 78a, 78b and 78c which are carried thereon.

Referring again to FIGURE 3, the horizontal paddle members 80a, 80b and 80c and the means for mounting and driving the same will be described only briefly, since such mechanism is substantially identical to the means for mounting and driving the paddles 78, except that the latter three paddles move in a clockwise direction about their generally rectangular path as viewed in FIGURE 3, while the paddles 80 move at the same speed and in unison theerwith but in a counterclockwise direction. A roller or silent chain 88 is trained over four sprockets 180, 182, 184 and 186 which are mounted on four shafts 188, 190, 192 and 194, respectively, the shaft 188 being a drive shaft and the others being stub shafts. Four additional sprockets 180', 182', 184' and 186' are mounted on the other end of the drive shaft 188 and on separate stub shafts 190', 192' and 194', respectively, and the latter four sprockets have the second roller or silent chain 90 trained thereover for movement in a generally rectangular path.

In addition, a third stabilizer chain 196 is mounted and driven in a matter substantially identical to the stabilizer chain 142 previously described herein, and the chain 196 cooperates with stabilizer arms 198, 200 and 202 so as to maintain the paddles 80a, 80b and 80c in horizontal positions at all times as they move in a counterclockwise direction around their generally rectangular path. The shaft 188 functions as a drive shaft so that the sprockets mounted thereon drive the chains 88, 90 and 196 at the same speed, while the other six shafts 190, 192, 194 and 190', 192' and 194' are all stub shafts. An endless chain 204 is trained over a sprocket 206 at one end of the drive shaft 110 (see FIGURES 2 and 3), and the chain 204 drives the shaft 188 through reversing spur gears 208 and 209. In this manner, the two drive shafts 110 and 188 are interconnected so that one will drive the other with one rotating in a clockwise direction and the other in a counterclockwise direction.

ELEVATOR MECHANISM

The elevator collecting plate 82 and drive mechanism for raising and lowering the same will now be described, and for this purpose reference is first made to FIGURES 9 and 10 which show an elevator carriage 220 which is moveable upwardly and downwardly on a pair of certical guide rods 222 and 224. The carriage 220 has mounted thereon the elevator collecting plate 82 which is disposed in a horizontal plane and which as shown in FIGURE 3 is positioned so as to receive magazines M which are released by the moveable series of paddle members 78 and 80. As will be explained more fully hereinafter, the elevator plate 82 is moveable upwardly to the upper end of its stroke at the beginning of a stack collecting cycle so that a magazine released by a pair of the paddles 78 and 80 will drop only a very short distance before landing on the top of the elevator collecting plate (see FIGURE 15). Then, as additional magazines are dropped one by one, the plate 82 is slowly moved downwardly so that the stack being formed thereon will not interfere with the moveable paddles. Once the stack on the collecting plate 82 comprises the desired number of magazines, or when the end of a town is reached, the collecting plate moves downwardly to its lowermost position as shown in FIGURES 3 and 17 to permit the stack to be removed, as will be explained more fully hereinafter.

Figure 8:
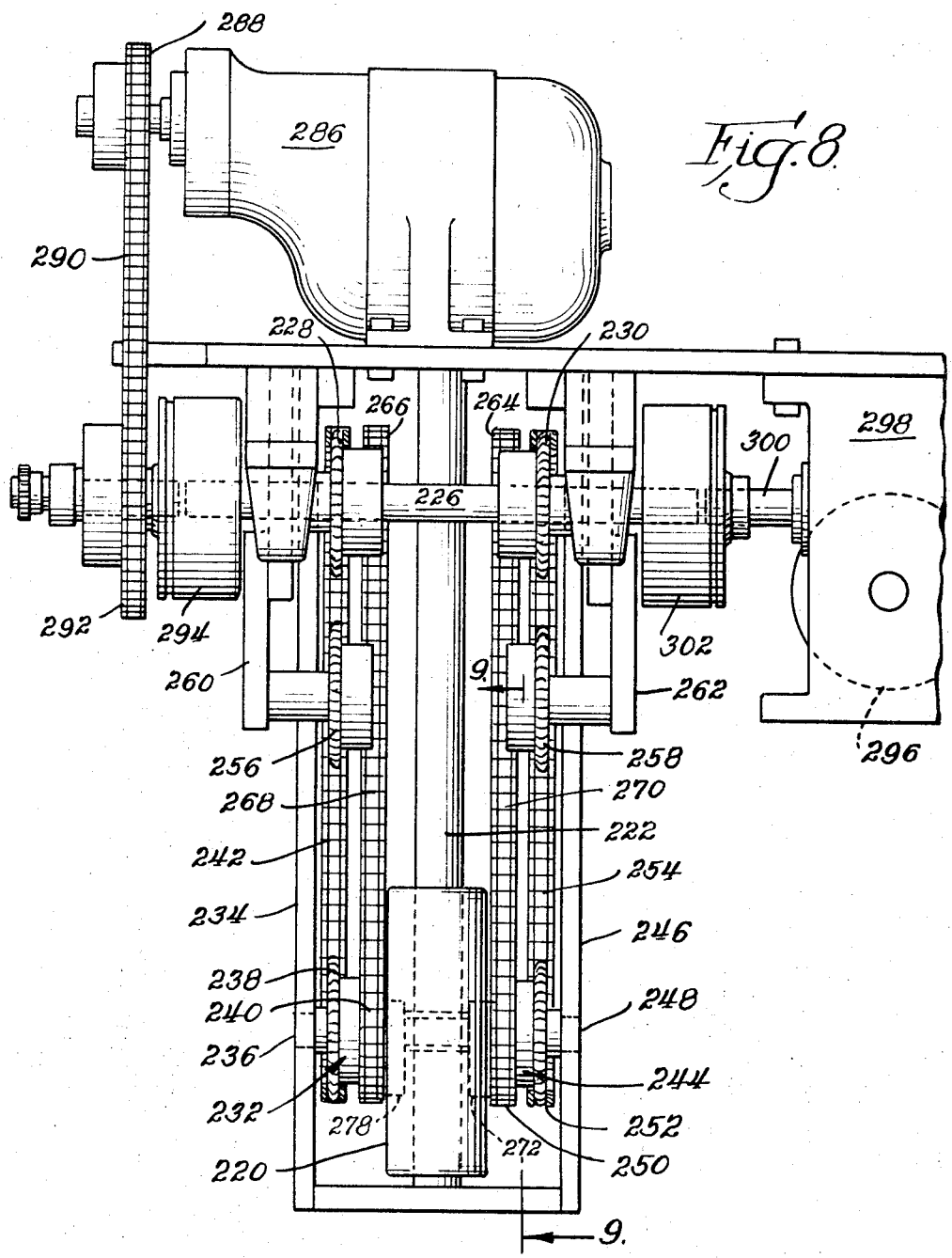
FIGURE 8 is an elevational view looking approximately in the direction of the arrows 8—8 of FIGURE 6.

FIGURE 8 shows a drive shaft 226 having a pair of sprockets 228 and 230 mounted thereon. A dual sprocket 232 is mounted from a frame 234 by a pin 236 so as to be disposed beneath and to one side of the sprocket member 228, and the dual sprocket comprises two side-by-side sprocket members 238 and 240. A drive chain 242 is trained over the sprocket 228 and over the outer sprocket teeth 238 on the dual sprocket 232 so as to drive the latter from the drive shaft 226. In a similar manner, a second dual sprocket 244 is mounted from a frame 246 by a pin 248 so as to be in alignment with the dual sprocket 232 and on the opposite side of the vertically movable elevator carriage 220. The dual sprocket 244 is provided with two side-by-side sets of sprocket teeth 250 and 252, and a drive chain 254 is trained over the sprocket 230 and over the outer sprocket teeth 252 so as to drive the dual sprocket 244 from the drive shaft 226. A pair of idler sprockets 256 and 258 are mounted on arms 260 and 262, respectively, and the latter sprockets are adjustable for adjusting the take-up in the two drive chains 242 and 254.

Referring to FIGURES 6 and 8, a pair of sprockets 264 and 266 are supported from the frame members 234 and 246 so as to be disposed in vertical alignment with the inner sets of teeth 240 and 250 on the dual sprockets 232 and 244 respectively. A first operating chain 268 is trained over the sprocket 266 and over the inner sprocket teeth 240 on the dual sprocket 232, and a second operating chain 270 is trained over the sprocket 264 and over the inner sprocket teeth 250 on the dual sprocket 244. It will be seen that the two operating chains 268 and 270 extend vertically on opposite sides of the elevator carriage 220. As best shown in FIGURES 7 and 9, the operating chain 270 has an arm 272 rigidly fixed to the side thereof by a pair of pins or the like 274 and 276, and the arm extends inwardly from the chain and is perpendicular thereto. A similar arm 278 is fixed to the side of the operating chain 268 by a pair of pins 280 and 282 so as to be opposite and parallel to the arm 272. A cross rod 284 extends through the elevator carriage 220, and one end of the rod is clamped in the arm 272 while the other end is clamped in the arm 278. The rod 284 is free to rotate in the carriage 220 but is keyed to the arms 272 and 278 so as to be held against rotation relative to such arms.

It will now be understood that the operating chains 268 and 270 act through the arms 278 and 272 and the cross rod 284 to drive the elevator carriage 220 and elevator collecting plate 82 upwardly and downwardly on the guide rods 222 and 224. The drive shaft 226 is always driven in the same direction, and thus the two operating chains 268 and 270 always move in the same direction around their respective sprockets. When the particular chain links to which the arms 272 and 278 are attached are moving downwardly, the arms will move the cross rod 282 and carriage 220 downwardly, and when such links are moving upwardly the carriage 220 will be moved upwardly therewith. It will be seen that the effective length of each of the arms 272 and 278 is equal to the effective radius of each of the lower sprockets 240 and 250 (see FIGURE 9) and the upper sprockets 264 and 266. Accordingly, as the chain links carrying the arms 272 and 278 are moving downwardly, the latter move the elevator carriage 220 downwardly, until the cross rod 284 is approximately coaxial with the axis of the sprockets 240 and 250. At the latter point the chain links to which the arms 272 and 278 are attached move around the respective sprockets 240 and 250 and the arms pivot through 180 degrees (see FIGURE 6) about the axis of the sprockets 240 and 250. Thereafter the arms 272 and 278 are carried upwardly by the chains 268 and 270 and thereby raise the elevator carriage 220. At the upper end of its travel the carriage 220 will again stop momentarily while the arms 272 and 278 pivot 180 degrees about the axis of the sprockets 264 and 266, after which the carriage will be moved downwardly again.

Drive means will now be described for driving the elevator drive shaft 226 and thereby raising and lowering the elevator carriage 220 and collecting plate 82. FIGURES 6 and 8 show a motor 286 having a motor sprocket 288, and a chain 290 is trained over the motor sprocket 288 and over a sprocket 292. The sprocket 292 drives the shaft 226 at a relatively high speed through a magnetic clutch 294. Thus, whenever the magnetic clutch 294 is energized the motor 286 will rotate the shaft 226 so as to raise or lower the carriage 220 and collecting plate 82 at a relatively high speed. In addition to the foregoing high speed drive for the elevator collecting plate 82, a second drive is also provided which moves the collecting plate at a relatively slow speed in timed relation with the label affixing unit II, the latter drive normally being used only on the downward stroke of the collecting plate.

FIGURES 6 and 8 show a pulley 296 which acts through a gear box 298 to drive a shaft 300, and the shaft 300 drives the shaft 226 through a second magnetic clutch 302, it being understood that when the clutch 302 is energized the pulley 296 rotates the shaft 226 in the same direction as the motor 286 but at a much lower speed. The pulley 296 is driven from the drive (not shown) for the label affixing unit II, and the pulley 296 will rotate continuously whenever the label affixing unit is operating. However, the magnetic clutch 302 will be energized only during the stacking of magazines on the elevator collecting plate 82, the purpose being to lower the plate 82 slowly during a stacking operation so that the latter will move downwardly at approximately the same rate at which the height of the magazine stack is increasing, whereby the first and last magazines dropped to the elevator plate 82 will fall approximately the same short distance. The elevator speed produced by the foregoing slow speed drive from the label affixing unit II is of course preferably adjusted in accordance with the thickness of the magazines being stacked. As will be explained more fully later herein, after a full stack of magazines has accumulated on the elevator plate 82, the low speed clutch 302 is deenergized and the high speed clutch 294 is energized so that the motor 286 will drive the elevator carriage 220 and collecting plate 82 downwardly at high speed to an unloading position where the stack is automatically removed. Moreover, after removal of the stack, the clutch 294 is again energized causing the motor 286 to raise the elevator plate 82 at high speed to its original upper position where it will again receive magazines from the paddle members 78 and 80.

TAKE-AWAY CONVEYOR

Reference is now made to FIGURES 2 and 3 which show the take-away conveyor V for removing a stack of magazines M from the elevator collecting plate 82 after the latter has been moved downwardly to its lowermost position as shown. A sprocket shaft 306 has its ends supported from frame members such as shown at 308. A pair of chain sprockets 310 and 312 are mounted in side-by-side relation adjacent one end of the shaft 306, and a second pair of sprockets 314 and 316 are mounted adjacent the other end of the shaft. Four endless drive chains 318, 320, 322 and 324 are trained over respective ones of the conveyor sprockets 310, 312, 314 and 316, and each such chain extends along the length of the conveyor V to the other end thereof where it is driven by suitable drive means (not shown).

The conveyor V includes a plurality of platform members 326a, 326b and so on which are affixed to the drive chains 318, 320, 322 and 324 in spaced relation along the length of the latter so that as the chains are driven to move one of the platforms 326 out from beneath the elevator plate 82, a further platform 326 will move into a loading position beneath the plate. Each of the platforms 326 comprises a plurality of slats 328 which are linked together by a pair of chain members 330 (see FIGURES 2 and 3) which each extend along the length of the platform transversely to the slats 328. The platforms 326 are thus made flexible so that they can bend as the drive chains 318, 320, 322 and 324 to which they are connected pass around the sprockets 310, 312, 314 and 316. FIGURE 2 shows a pair of lugs 332 and 334 which project laterally outwardly from opposite ends of the trailing slat 328 of each platform 326 and which connect with the two outer drive chains 318 and 324. In addition, a pair of lugs 336 and 338 project laterally outwardly from the underside of the leading slat 328 of each platform 326 and connect with the two inner drive chains 320 and 322. In this manner each of the several platforms 326 is connected to the four drive chains 318, 320, 322 and 324 so as to be carried thereby along the endless chain path. As will be explained more fully hereinafter, the foregoing chains are driven intermittently so that each time a platform 326 is loaded with a stack of magazines from the elevator plate 82, the conveyor V advances the next empty platform 326 to a loading position beneath the elevator plate and the conveyor is then stopped.

Each conveyor platform 326 has two upright stack support plates 340 and 342 at the leading end thereof and two upright stack support plates 344 and 346 at the trailing end thereof. The four upright support plates 340, 342, 344 and 346 on each conveyor platform 326 serve to hold a stack of magazines M which is lowered to the platform between the upright support plates by the elevator plate 82. As best shown in FIGURE 2, the upright support plates are spaced apart laterally by a distance which exceeds the width of the elevator plate 82 (see also FIGURE 10). Accordingly, after a full stack of magazines M has been accumulated on the elevator collecting plate 82, the latter is lowered to the position shown in FIGURES 2 and 3 so that it is disposed immediately over one of the conveyor platforms 326 which is waiting in a load position with the conveyor V stopped.

The stack of magazines M is thus lowered right between the four upright support plates 340, 342, 344 and 346. Thereafter, the conveyor V is operated to advance the next empty platform 326 to the loading position as the first-mentioned platform carries the magazine stack off of the elevator plate 82 which may then be raised. It will further be noted that because the platforms 326 are each comprised of a plurality of individual slats 328 held together by connecting chains 330, a pair of disc-like members 348 and 350 are mounted on the sprocket shaft 306 in alignment with the connecting chains 330. Thus, when one of the platforms moves around the end of the conveyor the connecting chains 330 ride over the discs 348 and 350 and in this manner the latter prevent the platforms from folding up or collapsing.

As shown in FIGURE 1, the conveyor V moves the stacks of magazines M one after the other to an elevator position alongside a supporting plate 352, and then the conveyor unloader VI pushes the stack from the platform 326 to the plate 352 thereby unloading the several platforms 326 one after the other as they arrive and stop at the unloader. The conveyor unloader VI includes a pair of support arms 354 and 356 which support a pair of horizontal guide rods 358 and 360, and a driven pusher assembly 362 having a depending pusher arm 364 is movable along the guide rods to push the magazine stack from the conveyor platform 326. The stacks may be removed by hand from the plate 352 for further handling, or the pusher assembly 362 may be arranged to move the stacks onto a further conveyor (not shown) leading to a tying and bagging station. It will be understood that in the particular embodiment being described the conveyor V elevates the magazine stacks as it conveys them to the unloader VI, and yet the platforms 326 must be maintained substantially horizontal while the stacks are being elevated to the height of the supporting plate 352. Thus, the leading end of each platform 326 must follow a different path from the trailing end thereof, thereby accounting for the arrangement where the leading end of each platform is connected with the two inner drive chains 320 and 322 while the trailing end of each platform is connected with the two outer drive chains 318 and 324.

ELECTRICAL CONTROL SYSTEM

Reference is now made to FIGURE 13 which comprises a simplified schematic electrical diagram of the control circuit for controlling the operation of the mechanism for driving the movable paddles 78 and 80, the mechanism for driving the elevator plate 82 upwardly and downwardly, and the mechanism for driving the take-away conveyor V, so that the foregoing components will all be operated in timed relation to one another. A pair of leads 366 and 368 of a 110 volt circuit are connected to a control circuit 370 which controls the operation of the take-away conveyor V. The control circuit 370 is connected by leads 372 and 374 with a solenoid 376, and it will be understood that the solenoid 376 operates a mechanical clutch (not shown) which controls starting and stopping of the take-away conveyor V. Preferably, a one cycle clutch is used in the drive for the conveyor V so that when the solenoid 376 is energized the conveyor will be driven through one cycle causing a loaded platform 326 to move out from beneath the elevator plate 82 and causing the next empty platform 326 to be moved into a loading position beneath the plate, after which the conveyor will be stopped until the solenoid 376 is again energized.

The 110 volt power source is also connected through leads 378 and 380 to a control circuit 382 which controls the drive for the paddles 78 and 80. The circuit 382 is connected by leads 384 and 386 to a solenoid 388 which operates the mechanical paddle clutch shown at 172 in FIGURE 1. As previously explained, the drive for the two series of paddles 78 and 80 is through the drive shaft 110, and the latter is driven only when the clutch 172 is engaged through energization of the solenoid 388. Accordingly, the control circuit 382 acts through the solenoid 388 to control the starting and stopping of the movable paddles 78 and 80.

A pair of leads 390 and 392 connect the power source to a control circuit 394 which in turn is connected with the magnetic clutch 294 of FIGURE 8 through a pair of leads 396 and 398. As previously described, energization of the magnetic clutch 294 causes the motor 286 to drive the shaft 226 and thereby drive the elevator carriage 220 and collecting plate 82 upwardly or downwardly as the case may be at a relatively high speed. In addition, a pair of leads 400 and 402 connect the power source to a control circuit 404 which in turn is connected with the second magnetic clutch 302 of FIGURE 8 through a pair of leads 406 and 408. As previously described, energization of the magnetic clutch 302 provides an operative driving connection between the shaft 226 and the pulley 296 which is driven at a slow speed from the label affixing unit II, and as will be seen hereinafter the clutch 302 is normally energized only when the elevator carriage 220 is to be driven downwardly.

FIGURE 13 further shows three switches 410, 412 and 414 which are connected to one side of the power source through a lead 416. There is also shown a control unit 430 which is connected through a lead 432 to the control circuit 382 for operating the solenoid 388 to disengage the paddle drive clutch 172. The control unit 430 is connected through a lead 434 to the control circuit 394 for engaging the magnetic clutch 294, and is further connected by a lead 436 to the control circuit 404 for disengaging the second magnetic clutch 302. In addition, the control unit 430 is connected by a lead 438 to the control circuit 370 for priming the latter to start the conveyor V when the elevator plate 82 reaches the bottom of its stroke. Accordingly, when the control unit 430 is operated the paddles 78 and 80 are stopped, the motor 286 is connected to the drive shaft 226 to drive the elevator carriage 220 and collecting plate 82 at high speed, the low speed elevator drive from the label affixing unit II is disconnected, and a signal is sent to the control circuit 370 to prime such circuit for operation of the conveyor V, although the conveyor is not actually driven until the elevator carriage 220 reaches the bottom of its stroke and closes the switch 414 as will be described hereinafter.

The control unit 430 is operated whenever a complete stack of magazines has been accumulated on the collecting plate 82, and this condition may be controlled either by a counter (not shown) which controls standard size stacks within a town, or it may be controlled by an end-of-town signal from the label affixing unit II which indicates that a new stack should be started so that each stack will contain only magazines addressed to the same town. Starting a new stack at the proper cut off point is facilitated by the fact that the paddles 78 and 80 normally receive and release one magazine at a time.

The elevator down switch 414 is connected through a lead 426 to the control circuit 394 for disengaging the magnetic clutch 294, and it is connected through a lead 428 to the control circuit 370 for actuating the conveyor clutch solenoid 376 to initiate the movement of the conveyor V through one cycle. Moreover, the switch 414 is positioned so as to be automatically closed when the elevator carriage 220 and collecting plate 82 reach the unloading position at the lower end of their stroke. Accordingly, after the elevator collecting plate 82 with a magazine stack thereon has been driven downwardly at high speed by the motor 286 to its unloading position at the lower end of its stroke, the motor 286 will be disconnected from the elevator drive to stop the collecting plate, and the conveyor V will be driven through one cycle to remove the stack from the collecting plate.

The elevator "stack off" switch 412 is connected by a lead 424 to the control circuit 394 for engaging the magnetic clutch 294 and thereby connecting the high speed motor 286 to the elevator carriage drive shaft 226. Moreover, the switch 412 is positioned so as to be closed automatically when the conveyor V has completed removal of a stack of magazines from the elevator collecting plate 82. Accordingly, once the elevator collecting plate 82 has been lowered to an unloading position immediately over one of the platforms 326 of the conveyor V and the conveyor has removed the stack from the collecting plate, the switch 412 will be closed and the collecting plate will be driven upwardly at relatively high speed to the upper end of its stroke.

The evelator up switch 410 is connected by a lead 418 to the control circuit 382 for operating the solenoid 388 to engage the paddle clutch 172 and thereby initiate movement of the paddles 78 and 80. The switch 410 is connected by a lead 420 to the control circuit 394 for disengaging the magnetic clutch 294 and thereby disconnecting the motor 286 from the elevator drive shaft 226. In addition, the switch 410 is connected by a lead 422 to the control circuit 404 for energizing the magnetic clutch 302 thereby causing the elevator carriage 220 and colecting plate 82 to be driven at a slow speed in timed relation with the label affixing unit II. It is important to note that the switch 410 is positioned so as to be automatically closed by the elevator carriage 220 when the latter reaches the upper end of its stroke. Thus, as soon as the elevator carriage 220 and collecting plate 82 reach the top of their stroke, the high speed motor 286 will be disconnected, the carriage will be driven downwardly at a slow speed in timed relation with the label affixing unit II, and the paddle clutch 172 will be engaged to drive paddles 78 and 80 through their generally rectangular paths.

OPERATION

The operation of the stacking machine III, diverter IV, take-away conveyor V and related components will now be described. A plurality of magazines M are fed endwise one at a time from the label affixing unit II to the stacking machine III by the conveyor 20. Such magazines move to the right as viewed in FIGURE 2 between the upper and lower conveyor belts 22 and 26. Where only one or a very small number of magazines are addressed to a given town, so that it is not practical to form a stack thereof, a label scaning member (not shown) at the label affixing unit II transmits a signal to energize the divert solenoid 48 thereby pivoting the diverter guide plate 42 downwardly to the position shown in solid lines. Therefore, magazines fed from between the belts of the conveyor 20 are conducted upwardly over the stacking machine II so as to pass between the diverter drive belts 50 and 52 and be conducted to a separate conveyor (not shown).

Normally, the diverter guide plate 42 will be disposed in its upper inoperative position as shown in dash lines in FIGURE 2, and the magazines ejected from between the upper and lower belts 22 and 26 of the conveyor 20 will be delivered against the adjustable stop plate 30 and will fall a short distance to a pair of the paddles 78 and 80. As previously described, the paddle drive shaft 110 is driven from the shaft 162 through the paddle clutch 172 and shaft 168 of FIGURE 1, and the shaft 162 is driven from the label affixing unit II. The sets of paddles 78 and 80 move clockwise and counterclockwise respectively as viewed in FIGURE 3, through generally rectangular paths, and they are driven in timed relation to the label affixing unit II and conveyor 20, so that each time a magazine is delivered against the stop plate 30 a pair of moving paddles 78 and 80 will be disposed substantially immediately beneath the magazine, whereby the magazine will fall a short distance and will be caught and supported by the paddles. FIGURE 14 shows the first entering magazine M for a new stack in position over a pair of moving paddles 78 and 80, the magazine being shown in solid lines in its approximate vertical position as it engages the stop plate 30, and being shown in dash lines after it has fallen a short distance to the moving paddles. At this time the elevator plate 82 will have just been moved to the upper end of its travel so as to be positioned approximately as shown in FIGURE 14. The paddles 78 and 80 cooperate to catch the magazine M as they are beginning the downward portions of their generally rectangular paths of movement and thus they lower the magazine under control to a lowered position as indicated approximately in FIGURE 15. The paddles 78 and 80, which as indicated above move in clockwise and counterclockwise directions respectively, then move away from one another and release the magazine to the top of the elevator collecting plate 82. It may be found desirable to provide upright guide plates (not shown) disposed at opposite sides of a magazine about to be released by a pair of paddles 78 and 80 as indicated in FIGURE 15, so as to prevent such a magazine from following either of the paddles as the latter move laterally away from one another and thereby serve in effect to strip the magazine from the paddles. It will be understood that the magazine initially falls only a very short distance before it lands on the paddles 78 and 80, and afther being lowered under control by the latter and released thereby it again falls only a very short distance to the elevator collecting plate 82.

The series of paddles 78 and 80 will continue to move along their gneerally rectangular paths so that each time a magazine is fed against the stop plate 30 a pair of paddles 78 and 80 will catch the magazine and release the same to the elevator plate 82 so as to accumulate a stack of magazines on such plate (see FIGURE 16). It is important to understand that during this time the elevator carriage 220 and collecting plate 82 will be slowly driven downwardly so that the plate 82 is lowered at the same rate at which the height of the magazine stack thereon is increasing. In this manner, the last magazine released to the plate 82 during formation of a given stack will fall approximately the same distance as the first magazine dropped to such plate. Such lowering of the elevator plate 82 is effected by energizing the slow speed magnetic clutch 302 of FIGURE 8 so that the elevator drive shaft 226 is driven from the pulley 296 which in turn is driven from the label affixing unit II.

When a desired number of magazines has accumulated on the elevator plate 82, the paddles 78 and 80 must be stopped so that the stack on the elevator plate can be removed. The size of the stack will normally be controlled by a counting device which transmits a signal after a predetermined number of magazines has been released to a stack on the plate 82. However, it is desired that each stack be comprised of magazines which are all addressed to the same town. Thus, scanning means (not shown) at the label affixing unit II scans the address labels and transmits a signal when the end of a town has been reached, whereby the paddles 78 and 80 will be stopped after the last magazine for a given town has been released to the elevator plate 82.

FIGURE 13 shows the control unit 430 which transmits a signal after a stack of magazines has accumulated on the elevator plate 82 and a new stack is to be started. The control unit 430 actuates the paddle clutch solenoid 388 so as to disengage the paddle clutch 172 of FIGURE 1 and thereby stop the series of paddles 78 and 80 with two of the paddles being positioned such as shown in FIGURE 17 so as to catch and support the magazines which are continuously being supplied one at a time from the label affixing unit II. At the same time the control unit 430 acts through the control circuits 394 and 404 to engage the high speed clutch 294 and disengage the low speed clutch 302. Thus, the elevator plate 82 which had been moving downwardly at a very slow rate of speed is now driven downwardly at a relatively high rate of speed by the motor 286.

When the elevator plate 82 having the stack thereon reaches the lower end of its travel so as to be positioned immediately over one of the platforms 326 of the conveyor V as shown in FIGURE 17, the switch 414 is automatically closed so as to disengage the high speed magnetic clutch 294 and stop the plate 82, and the closing of the switch 414 also actuates the conveyor clutch solenoid 376 so as to cause the conveyor V to move through one cycle. Thus, the platform 326 under the elevator plate 82 moves away taking the stack of magazines therewith as indicated in FIGURE 18, and the next empty conveyor platform 326 moves into position beneath the plate 82. As soon as the conveyor V has moved the magazine stack away from the elevator plate 82, the switch 412 is automatically closed so as to again engage the high speed magnetic clutch 294 thereby causing the elevator plate to be driven upwardly at high speed to the upper end of its stroke as in FIGURE 18. When the elevator plate 82 reaches the upper end of its stroke the switch 410 is automatically closed thereby causing the high speed clutch 294 to disengage and the low speed clutch 302 to engage so that the elevator plate will again be driven downwardly at a slow speed in timed relation with the label affixing unit II.

The closing of the switch 410 also causes the paddle clutch solenoid 388 to be energized thereby engaging the paddle clutch 172 so that the paddles 78 and 80 are again moved continuously around their generally rectangular paths in timed relation with the label affixing unit II. It will of course be understood that during the time the paddles 78 and 80 are stopped to permit a stack to be removed from the elevator plate 82, the magazines delivered from the label affixing unit II accumulate on a pair of the stationary paddles 78 and 80 as indicated in FIGURE 17, and thus when the movement of the paddles is once again initiated a plurality of magazines will be released to the elevator plate 82 simultaneously as indicated in FIGURE 18. Thereafter, however, the magazines will again be released one at a time to the plate 82 until the next stack has been completed.

It will be seen from the foregoing that the series of support paddles 78 and 80 move continuously around their rectangular paths so as to receive, lower under control and release the magazines one at a time, except during removal of a completed stack from the elevator plate 82 during which interval the paddles are stopped to receive and accumulate the magazines which are being delivered continuously one at a time from the label affixing unit II. It will also be seen that the elevator plate 82 moves downwardly at a slow speed while magazines are being released thereto one at a time. Then, when a full stack has accumulated on the plate 82, the plate moves downwardly at a high rate of speed to an unloading position, stops while it is being unloaded, moves upwardly at a high speed to the upper end of its travel, and then once again begins to move downwardly at a slow speed as the movement of the support paddles 78 and 80 is initiated to begin a new stack forming cycle.

The take-away conveyor V is driven through a one-cycle clutch whereby each time the conveyor clutch solenoid 376 is actuated the conveyor is driven so as to move a loaded platform 326 away from the elevator plate 82 and move the next empty platform into a loading position beneath the elevator plate, at which time the conveyor V is stopped. It should further be noted that when the paddles 78 and 80 are moving through their generally rectangular paths they receive an incoming magazine when they are near the upper portions of their paths as shown in FIGURE 14 so as to minimize the fall of the magazine. However, when the paddles are stopped to accumulate magazines while a completed stack is being removed from the elevator plate 82, the operative paddles stop at lower portions of their paths as shown in FIGURE 17 in order to provide vertical clearance for several magazines to accumulate on the paddles without interfering with incoming magazines being supplied from the conveyor 20.

FIGURE 11 shows a conveyor 20' which is similar to the conveyor 20 of FIGURE 2 but has a modified lower belt member to assist in feeding the magazines downwardly to a pair of the support paddles 78 and 80. An upper belt 22' is trained over a pulley 24', and a lower belt 26' runs over a pulley 28' and extends downwardly over a second pulley 28" which is spaced substantially beneath the pulley 28' so as to provide a vertical belt portion of rather substantial length which is approximately parallel with the adjustable stop plate. Accordingly, when a magazine M is ejected from between the horizontal runs of the belts 22' and 26' so as to be delivered against the stop plate 30, the vertical portion of the lower conveyor belt 26' will act as a guide and will also assist in feeding the magazine downwardly to a pair of the moving paddles 78 and 80. The foregoing kick-down action afforded by the belt 26' causes a magazine to reach the supporting paddles 78 and 80 in a shorter time than when gravity alone is relied upon, and thus permits the mechanism to operate at a higher speed.

It is important to understand that while the apparatus of the present invention has been described in conjunction with the stacking of magazines, it may also be used for stacking books, pamphlets and various other types of mailable matter. Thus, while we have described our invention in certain preferred forms, we do not intend to be limited to such forms, except insofar as the appended claims are so limited, since modifications coming within the scope of our invention will readily occur to those skilled in the art, particularly with our disclosure before them.

We claim:
1. In apparatus for stacking magazines or other generally flat articles suitable for mailing, the improvement comprising, in combination, supply means for supplying articles one at a time, movable supporting means for receiving articles from said supply means and for dropping the articles after temporarily supporting the same, and vertically reciprocating elevator means disposed beneath said supporting means for receiving articles dropped by said supporting means until a predetermined stack of said articles has accumulated, said elevator means lowering as the stack is accumulated thereon so that each article when dropped will fall approximately the same distance, said movable supporting means comprising at least two oppositely disposed supporting members which move in unison with one another and cooperate to temporarily support articles delivered by said supply means and drop such articles to said elevator means, said two oppositely disposed supporting members moving first directly downwardly after receiving an article and before releasing the same so as to lower said article under control toward said elevator means and thereafter moving directly outwardly away from one another so as to drop said article to said elevator means.

2. In apparatus for stacking magazines or other generally flat articles suitable for mailing, the improvement comprising, in combination, supply means for supplying articles one at a time, movable supporting means for receiving articles from said supply means and for dropping the articles after temporarily supporting the same, vertically reciprocating elevator means disposed beneath said supporting means for receiving articles dropped by said supporting means until a predetermined stack of said articles has accumulated on said elevator means, elevator drive means which drives said elevator means downwardly at a low speed in timed relation to said supply means when said supporting means is dropping articles to said elevator means so that each article when dropped to a stack on said elevator means will fall approximately the same distance, said elevator drive means comprising a reciprocating drive which causes said elevator means to reciprocate upwardly and downwardly, said reciprocating means including an endless chain trained over vertially spaced upper and lower sprocket members at least one of which is driven, and means connecting said elevator means to a link of said chain for movement upwardly and downwardly therewith, said elevator means being stationary when said link is passing around said upper and lower sprocket members.

3. In apparatus for stacking magazines or other generally flat articles suitable for mailing, the improvement comprising, in combination, supply means for supplying articles one at a time, movable supporting means for receiving articles from said supply means and for dropping the articles after temporarily supporting the same, vertically reciprocating elevator means disposed beneath said supporting means for receiving articles dropped by said supporting means until a predetermined stack of said articles has accumulated on said elevator means, take-away conveyor means disposed beneath said elevator means for automatically removing a stack of articles from said elevator means when the latter is moved downwardly to an unloading position adjacent said conveyor means, reciprocating drive means for driving said elevator means downwardly to an unloading position at the lower end of its travel wherein it is disposed immediately above said take-away conveyor means for cooperation with the latter, and control means for rendering said elevator drive means operative to move said elevator means to said unloading position after a predetermined stack of articles has accumulated on said elevator means, said take-away conveyor including a platform having a pair of upright stack support members at the rear end thereof for pushing said stack of articles from said elevator means, said upright stack support members being spaced apart a distance greater than the width of said elevator means so as to be movable past said elevator means for engagement with a stack thereon before said elevator means is driven upwardly away from its unloading position.

4. In apparatus for stacking magazines or other generally flat articles suitable for mailing, the improvement comprising, in combination, supply means for supplying articles one at a time, movable supporting means for receiving articles from said supply means and for dropping the articles after temporarily supporting the same, vertically reciprocating elevator means disposed beneath said supporting means for receiving articles dropped by said supporting means until a predetermined stack of said articles has accumulated on said elevator means, said supporting means comprising at least two oppositely disposed supporting members which move in unison with one another and cooperate to temporarily support articles delivered by said supply means and drop such articles to said elevator means, said two oppositely disposed supporting members being movable between supporting positions wherein they receive and support an article delivered by said supply means and release positions wherein they drop an article to said elevator means, support drive means for continuously moving said supporting members between said supporting positions and said release positions during accumulation of a stack of articles on said elevator means, and control means for rendering said support drive means inoperative so as to stop said supporting members in supporting positions when a predetermined stack of articles has accumulated on said elevator means, whereby said supporting members will accumulate articles delivered by said supply means while said elevator means is being unloaded.

5. The invention of claim 4 where said control means initiates the operation of said support drive means after said elevator means has been unloaded and returned to an article receiving position.

6. In apparatus for stacking magazines or other generally flat articles suitable for mailing, the improvement comprising, in combination, supply means for supplying articles one at a time, movable supporting means for receiving articles from said supply means and for dropping the articles after temporarily supporting the same, and vertically reciprocating elevator means disposed beneath said supporting means for receiving articles dropped by said supporting means until a predetermined stack of said articles has accumulated on said elevator means, said supporting means comprising at least two oppositely disposed supporting members which move in unison with one another and cooperate to temporarily support articles delivered by said supply means and drop such articles to said elevator means, each of said two oppositely disposed supporting members being mounted for movement around a corresponding one of two generally rectangular paths, one of said supporting members being moved clockwise and the other counterclockwise around their respective paths in unison with one another, said paths being spaced apart in such a manner that said supporting members move horizonally inwardly toward one another and cooperate to support an article dropped by said supply means, then move downwardly together to lower said article under control, and then move horizontally outwardly away from one another to release said article to said elevator means.

7. The invention of claim 6 where each supporting member is carried by an endless chain trained over a plurality of sprockets so as to move in a generally rectangular path.

8. The invention of claim 6 where each supporting member includes a generally flat horizontal supporting surface, and stablizing means for maintaining each supporting member in a horizontal position at all times as it moves around its generally rectangular path.

9. The invention of claim 6 where a plurality of supporting members are provided at spaced intervals around each generally rectangular path for movement in unison with one another around each of said paths.

10. In apparatus for stacking magazines or other generally flat articles suitable for mailing, the improvement comprising, in combination, supply means for supplying articles one at a time, movable supporting means for receiving articles from said supply means and for dropping the articles after temporarily supporting the same, vertically reciprocating elevator means disposed beneath said supporting means for receiving articles dropped by said supporting means until a predetermined stack of said articles has accumulated on said elevator means, diverting means around above said movable supporting means so that both said diverting means and said movable supporting means are capable of receiving articles delivered by said supply means, diverter guide means movable between a first normal position wherein it permits articles delivered by said supply means to be received by said supporting means and a second position wherein it directs articles delivered by said supply means to said diverting means, and said diverting means including conveying means for conveying said articles delivered thereto past said stacking apparatus without stacking of said articles, said supply means comprising a supply conveyor member, and said diverter guide means comprising a pivotally mounted guide plate disposed adjacent an outlet end of said supply conveyor.

11. In apparatus for stacking magazines or other generally flat articles suitable for mailing, the improvement comprising, in combination, supply means for supplying articles one at a time, movable supporting means driven in timed relation with said supply means for receiving articles from said supply means and for dropping the articles after temporarily supporting the same, vertically reciprocating elevator means disposed beneath said supporting means for receiving articles dropped by said supporting means until a predetermined stack of said articles has accumulated on said elevator means, said supporting means including two sets of support members each set comprising a plurality of support members mounted in spaced relation for movement around a corresponding generally rectangular path, one set of support members being moved clockwise around one path and the other set of support members being moved counterclockwise around the other path in unison with said first set, said two paths being spaced apart in such a manner that two corresponding support members one in each set will move horizontally inwardly toward one another and cooperate to support an article dropped by said supply means, will then move downwardly together to lower said article under control, and will then move horizontally outwardly away from one another to release said article to said elevator means, each of said support members being generally flat and disposed in a horizontal plane, and stabilizing means for maintaining each support member in horizontal position at all times as it moves around its generally rectangular path.

12. The invention of claim 11 where each set of support members comprises a plurality of support members mounted on an endless chain trained over a plurality of sprockets so as to move in a generally rectangular path.

References Cited

UNITED STATES PATENTS

| 738,778 | 9/1903 | Cundall | 214—6 |
| 2,489,004 | 11/1949 | Beaumont et al. | 214—6 |
| 2,984,838 | 5/1961 | Parker | 214—6 |
| 3,255,895 | 6/1966 | Klingler | 214—6 |

FOREIGN PATENTS 812,537   9/1951   Germany.

GERALD M. FORLENZA, *Primary Examiner.*

R. J. SPAR, *Assistant Examiner.*

U.S. Cl. X.R.

187—17; 271—68, 88